A. N. FAULKNER.
ROPE TESTING MACHINE.
APPLICATION FILED NOV. 20, 1914.
1,168,870.
Patented Jan. 18, 1916.
3 SHEETS—SHEET 1.
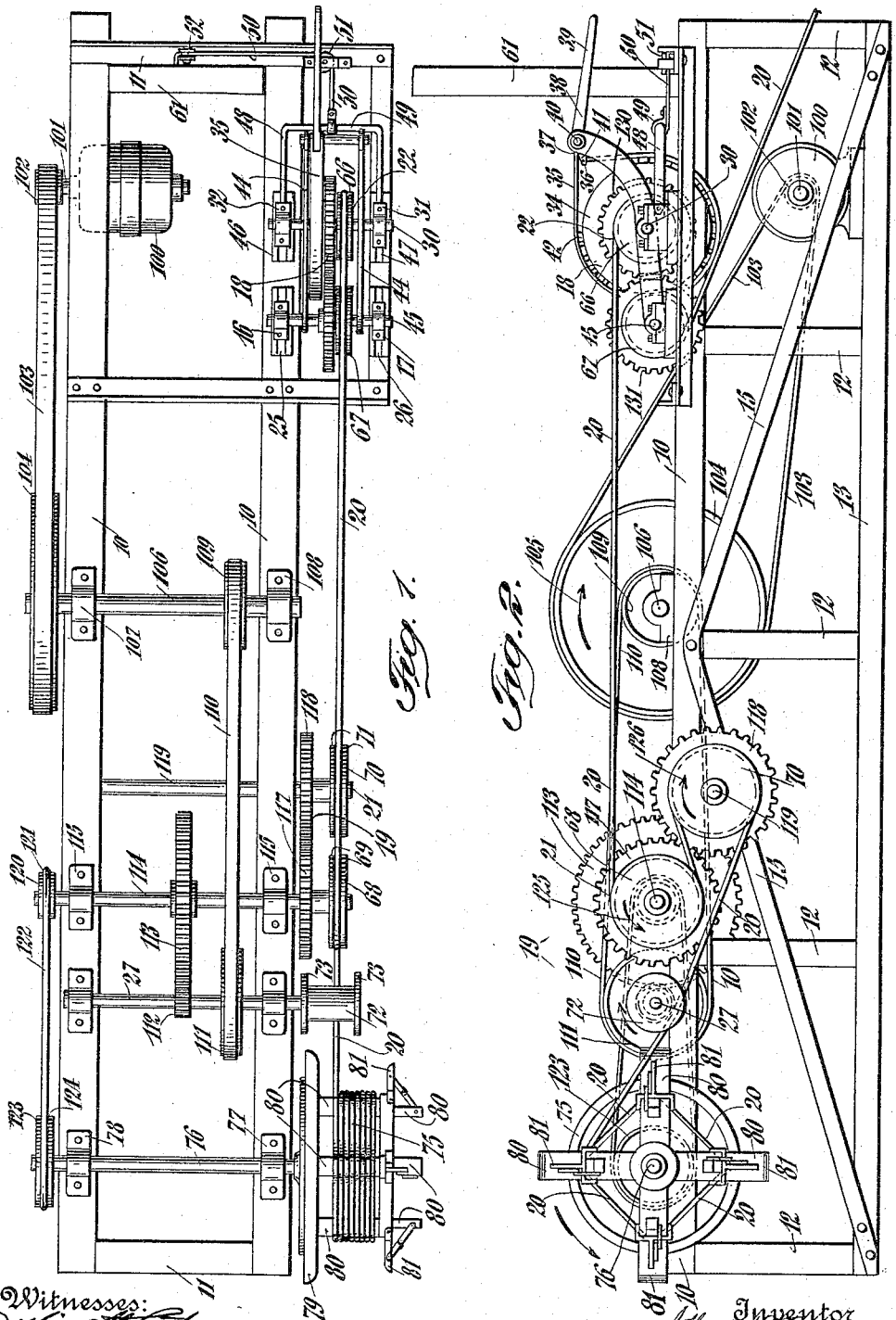
Witnesses:
Inventor
Albert N. Faulkner
By his Attorney
C. P. Goepel

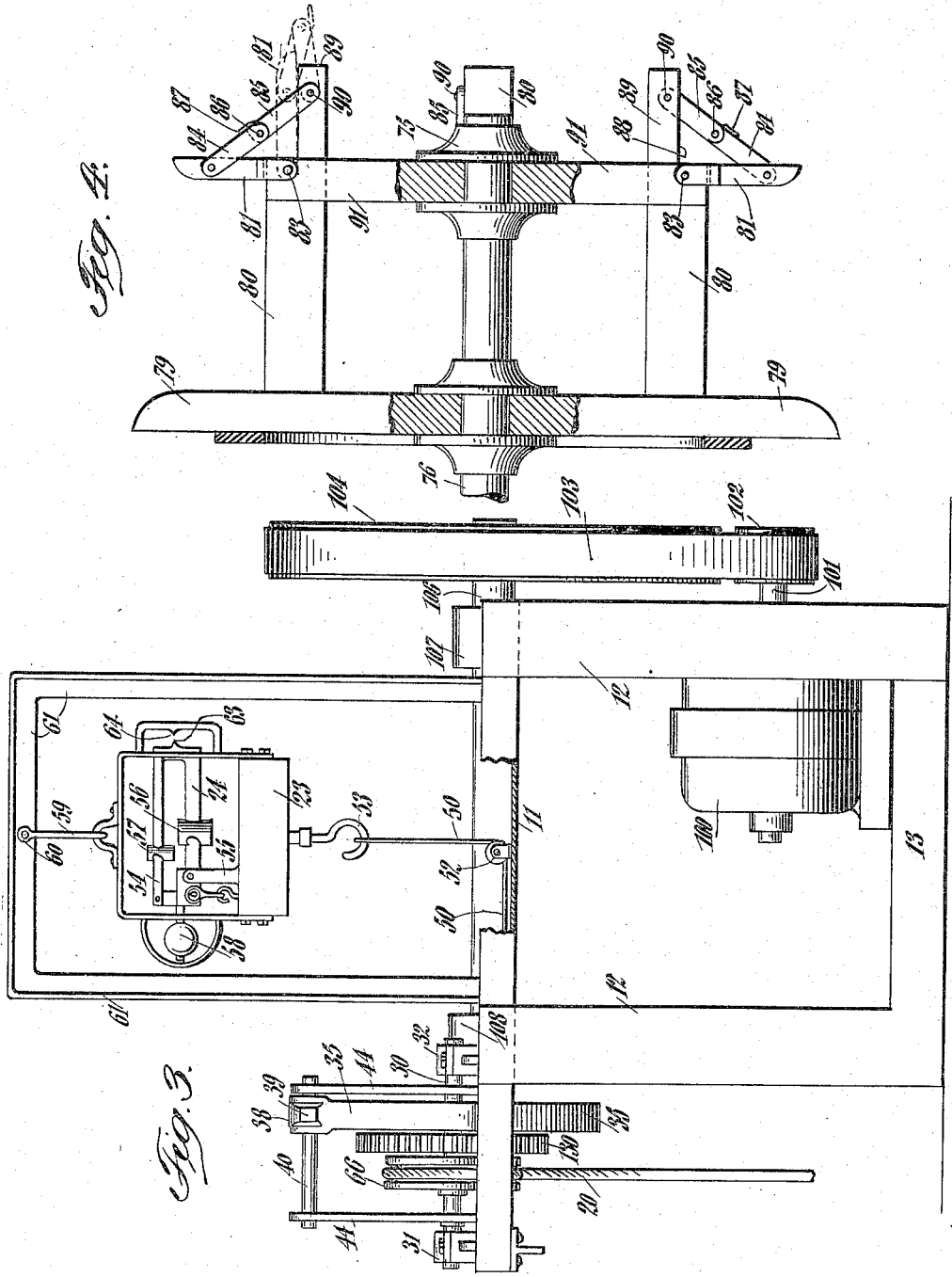

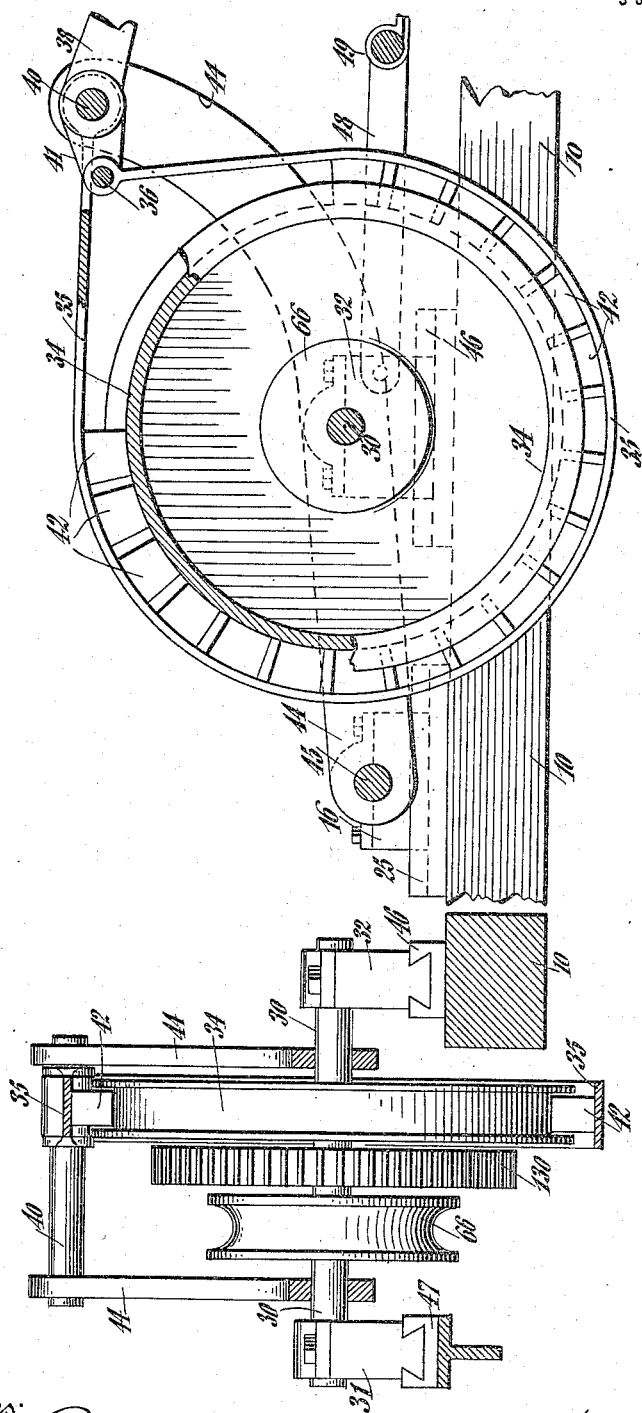

UNITED STATES PATENT OFFICE.

ALBERT N. FAULKNER, OF NEW YORK, N. Y., ASSIGNOR TO CHESEBRO WHITMAN CO., A CORPORATION OF NEW YORK.

ROPE-TESTING MACHINE.

1,168,870.

Specification of Letters Patent.

Patented Jan. 18, 1916.

Application filed November 20, 1914. Serial No. 873,141.

*To all whom it may concern:*

Be it known that I, ALBERT N. FAULKNER, a subject of the King of England, and resident of New York, in the borough of Manhattan, county and State of New York, have invented certain new and useful Improvements in Rope-Testing Machines, of which the following is a specification.

This invention relates to rope-testing machines, and has for its object to provide a machine to test rope that is used for scaffolding devices and similar structures, wherein the lives of the operatives depend upon the secure holding of the suspending rope.

The object is to furnish a machine which will subject the rope to be used in installations of the character referred to, to a test corresponding to a strength greater than that needed in actual use, so as to enable any defects in the rope which would be the cause of the breaking of the same to be found before the rope goes into use.

The invention is shown in the accompanying drawings and will be more fully described hereinafter and finally pointed out in the claims.

In the drawings, Figure 1 is a plan view of a rope-testing machine embodying the invention, Fig. 2 is a side view thereof, Fig. 3 is an end view thereof on a larger scale, Fig. 4 is a detail view of the rope-winding member, Fig. 5 is a detail view partly in section, of the braking device, and Fig. 6 is a side view thereof.

Similar reference numerals indicate corresponding parts throughout the various figures of the drawings.

Referring to the drawings, and more particularly to Figs. 1 and 2, the machine comprises a frame having horizontal members 10 and transverse end-members 11. These are supported by standards 12 secured to a base-plate 13, and the whole is strengthened by diagonal braces 15. Arranged at one end of the frame is a braking mechanism 18 clearly shown in Fig. 2, which serves to retard the movement of the rope against a pulling action exerted by a pulling mechanism 19 at the other end of the frame. By the relative forces exerted by the drawing mechanism 19 and the retarding mechanism 18, a certain amount of pull is exerted on the rope 20 between the points 21 and 22, and thereby that portion of the rope momentarily between the points 21 and 22 is subjected to this testing pull. The amount of resistance offered by the braking mechanism 18 in proportion to the pull, is ascertained by a scale 23 clearly shown in Fig. 3, which is so arranged that when the amount of pull at the point 21 is in proper proportion to the amount of retardation at the point 22, the scale-beam 24 remains in its normal position, but in the event of the pull being greater or the retardation being greater, the scale beam 24 is moved correspondingly, and thereby the operative knows that the proper relationship of the pull and retardation is not being maintained. To carry out this operation, the braking mechanism consists of a Pronybrake, the drum 34 of which is mounted on a shaft 30, supported in bearings 31 and 32, and is surrounded by the flexible band 35, which band is secured at 36 and at 37, and is operated by means of the lever 38 having the handle 39 and pivoted at 40, and which has one end 41 secured to the end 36 of the band 35. By the downward movement of the handle 39, the band 35 is tightened around the drum 34, and the individual friction blocks 42 exert thereby greater friction on the drum 34 than when the band 35 is loose. By varying the pressure applied to the handle 39, greater or less friction is exerted and thereby the movement of the shaft 30 is correspondingly affected. The crossrod 40 is supported between curved arms 44 which are secured at their rear ends to a shaft 45 which is mounted in bearings 16, 17, which are slidably mounted in guideblocks 25, 26, secured to the frame of the machine.

The bearings 31 and 32 are movable in guide-ways 46 and 47. The shaft 30 passes through the arms 44, and hence said arms secure the shafts 30 and 45 in fixed relation, so that the bearings of both slide together in their guide-ways. Gear-wheels 130, 131, on the shafts 30 and 45, cause these shafts to turn simultaneously at the same speed. The bearings 31 and 32 are connected to a U-shaped stirrup 48 which is connected at 49 with a rope 50 which passes over a pulley 51 and over a second pulley 52 and has its end extending upwardly to a hook 53 of the scale 23. The scale 23 is arranged in the usual and well known manner, and has levers 24, 54, and weights 56, 57 and 58 operated in the usual way, the entire scale 23 being secured at 60 by the shackle 59 to an upright frame 61, which is supported on the main frame. When the pointer 63 and the indicating mark 64 are opposite each other, equilibrium exists between the weighted scale and the amount of pull exerted on the rope.

The rope 20 to be tested passes from a suitable reel or coil (not shown) over a pulley 67 secured to the shaft 45, and then over a pulley 66 secured to the shaft 30.

At the other end of the machine a pulling device is arranged which receives the rope 20 from pulley 66, over a pulley 68 having lateral flanges 69. Thence the rope passes over a second pulley 70 also provided with lateral flanges 71, wherefrom it is guided by an idler 72 having flanges 73, and then on to a winding reel 75. This winding reel is supported on a shaft 76 which is guided in bearings 77 and 78, and has a radial flange 79 which serves to prevent the rope from getting in contact in any way with the frame of the machine. From the flange 79 arms 80 extend outwardly. The arms have at their ends collapsible fingers 81 which serve to retain the rope between the fingers 81 and the flange 79 during the winding of the rope on the reel. After the entire rope has been tested and wound on the reel, and it is desired to remove the rope, the fingers 81 are collapsed, whereby the rope may be readily removed in the form of a coil from the reel. Each of these collapsible fingers consists of a member 81 pivoted at 83 to the arm 80, and adapted to be held in upright position by two links 84 and 85 pivoted to each other at 86, one of which links has a lug 87 which serves to hold the links 84 and 85 in the position shown in Fig. 4, and prevent these links 84 and 85 from collapsing, and thereby cause the links 84 and 85 to operate as if only one strut were present, to hold the member 81 in upright position. When, however, it is desired to collapse the fingers 81, the links 84 and 85 are moved so as to take the position shown in dotted lines in Fig. 4. Having thus moved the fingers 81 out of the path of the rope, the coil which is wound on the reel may be readily removed. For the purpose of suitably supporting the links 85 and positioning the fingers 81, the arms 80 are recessed as indicated at 88, and the outwardly-projecting portions 89 act as supports and bearings for the pivots 90 of the links 85. A spider 91 on the shaft 76 supports the arms at their outer ends.

The pulling mechanism is operated by a transmission train from the motor 100, which is suitably arranged on the base of the machine. The motor shaft 101 has a pulley 102 over which a belt 103 passes to pulley 104, in the direction of the arrow 105. The pulley 104 is mounted on a shaft 106 supported in bearings 107 and 108 and transmits power by a pulley 109, belt 110, and pulley 111, to a countershaft 27. To the shaft 27 the idler 72 above referred to is also secured. The shaft 27 is also provided with a pinion 112 which meshes with a gear 113 secured to the shaft 114, which shaft is supported in bearings 115 and carries the pulley 68. To the shaft 114, the gear 117 is secured which meshes with the gear 118 secured to the shaft 119. To shaft 119 the pulley 70 is secured. The shaft 114 has also secured thereto a pulley 120 which is provided with a groove 121 over which a rope-belt 122 passes. The rope 122 passes also over a pulley 123 which is provided with a groove 124, and secured to the shaft 76. The object of using a rope-belt between the pulleys 120 and 123 is to provide a yielding transmission, as the rope 122 will slip on the pulleys, as may be necessary during the winding up of the rope over the winding reel 75. By this train of mechanism, the pulleys 68 and 70 are rotated in the direction of the arrows 125 and 126, and they cause the rope 20 to be given the necessary pull so as to draw it away from the braking mechanism. By the amount of resistance offered by the braking mechanism against the pull offered by the pulling mechanism, the portion of the rope 20 between the points 21 and 22 is subjected to the necessary test.

By the operation of these parts as described, the entire rope which is intended to be used for scaffolding devices or the like, is subjected to a test of the necessary pounds pull, and in the event of any weak strands in the rope which are unable to resist this pull, they will break, and the operative in examining the rope on the winding drum 80 will discover these breaks and thereby cause the rope to be discarded or repaired as the case may be.

By the mechanism described, a very efficient device is produced, which has for its object to test the rope so as to prevent any unsafe ropes to leave the factory, by reason of which inferiority of the rope which may not have been tested, the lives of human beings may be lost by its breaking.

I have described a testing machine applicable to the testing of ropes, but it is clear that cables of steel, wire, copper or other suitable material of one or more strands, wires, chains, cordage, line, etc., may be used and tested instead of the rope described, and these may be subjected to the tests described, so that by "rope" or "line" I intend to include any like article as intimated.

I have described one embodiment of my invention, but it is clear that changes may be made therein without departing from the spirit of the same as defined in the appended claims.

I claim:

1. A rope-testing machine, comprising rope-advancing means, rope-retarding means spaced therefrom, and comprising a slidably-mounted Prony-brake mechanism, and a scale connected with said mechanism and exerting a constant pull thereon away from the advancing-means.

2. A rope-testing machine, comprising rope-advancing means, rope-retarding means spaced therefrom, and comprising a slidably-mounted Prony-brake mechanism, a scale connected with said mechanism and exerting a constant pull thereon away from the advancing means, means for driving said advancing means at constant speed, and a winding-reel beyond the advancing means.

3. A rope-testing machine, comprising rope-advancing means, rope-retarding means spaced therefrom, and comprising a slidably-mounted Prony-brake mechanism, a scale connected with said mechanism and exerting a constant pull thereon away from the advancing means, means for driving said advancing-means at constant speed, a winding-reel beyond the advancing means, and a slip-belt connecting said winding-reel with said driving-means.

4. A rope-testing machine, comprising rope-advancing means, and rope-retarding means spaced therefrom and consisting of parallel shafts, means connecting the same at a fixed distance, rope-pulleys, one on each shaft, gears between said shafts for causing them to turn simultaneously at the same speed, a friction-drum secured to one shaft, a friction-band applied to said drum, a lever connected with the end of said band for tightening or loosening the same on the drum, bearings for said shafts, shiftable toward and away from the advancing means, and a pulling-means connected with one set of said bearings and exerting a constant pull thereon away from the rope-advancing means.

5. A rope-testing machine, comprising rope-advancing means, and rope-retarding means spaced therefrom and consisting of parallel shafts, means connecting the same at a fixed distance, rope-pulleys, one on each shaft, gears between said shafts for causing them to turn simultaneously at the same speed, a friction-drum secured to one shaft, a friction-band applied to said drum, a manually-operable lever connected with the ends of said band for tightening or loosening the same on the drum, bearings for said shafts, shiftable toward and away from the advancing means, and a pulling-means connected with one set of said bearings and exerting a constant pull thereon away from the rope-advancing means, said pulling-means comprising a scale-beam and weights adjustable thereon.

6. A testing machine, comprising retarding means adapted to exert a retarding action on a line to be tested, advancing means spaced from the said retarding means, and adapted to guide the line away from said retarding means and means adapted to regulate the retardation of the said retarding means, to exert a predetermined pull on the line guided between the said retarding means and the said advancing means.

7. A testing machine, comprising slidably mounted retarding means, adapted to exert a retarding action on a line to be tested, advancing means spaced from said retarding means, and adapted to guide the line away from said retarding means, means adapted to regulate the retardation of the said retarding means, to exert a predetermined pull on the line guided between the said retarding means and the said advancing means, and a scale connected to said slidable retarding means to indicate the amount of pull on the said line.

In testimony, that I claim the foregoing as my invention, I have signed my name in presence of two subscribing witnesses.

ALBERT N. FAULKNER.

Witnesses:
JOSEPHUS MARSH,
P. L. BLAIKIE.